3,036,118
MIXTURES OF NOVEL CONJUGATED POLY-OXYETHYLENE-POLYOXYPROPYLENE COMPOUNDS

Donald R. Jackson, Wyandotte, and Lester G. Lundsted, Grosse Ile, Mich., assignors to Wyandotte Chemicals Corporation, Wyandotte, Mich., a corporation of Michigan
No Drawing. Filed Sept. 11, 1957, Ser. No. 683,227
14 Claims. (Cl. 260—484)

This invention relates to mixtures of novel conjugated polyoxyethylene - polyoxypropylene compounds. In a more specific aspect, this invention relates to new nonionic surface active agents and a method for preparing same wherein the new surface active agents are essentially mixtures of conjugated or "block" polymers of ethylene oxide and propylene oxide.

This application is a continuation-in-part of our application Serial No. 365,244, filed June 30, 1953, now abandoned.

Nonionic surface active agents composed of a water-insoluble or hydrophobic nucleus, such as a long hydrocarbon chain or an alkyl-substituted ring compound, e.g. nonylphenol, and a water-solubilizing polyoxyethylene chain are well known in the art. Such surface active agents have excellent properties for many uses, but a disadvantage in this class of materials lies in the inflexibility of the water-insoluble or hydrophobic portion of the molecule. Any alteration in properties attributable to the hydrophobic portion of the surfactant can only be accomplished by selecting a completely different water-insoluble compound with which to condense ethylene oxide. Frequently however, different uses of surfactants require varying surfactant properties which differ only in small increments for the best performance.

An important contribution to the art in this regard is represented by the disclosure of L. G. Lundsted in U.S. 2,674,619, issued on April 6, 1954. Lundsted disclosed new surfactant compositions which are exemplified by the mixtures obtained by sequentially condensing propylene oxide with a lower molecular weight reactive hydrogen compound, such as propylene glycol, to produce a water-insoluble, hydrophobic polyoxypropylene polyol, and then condensing ethylene oxide with the polyoxypropylene polyol in an amount sufficient to solubilize the polyoxypropylene polyol and provide surface active properties. With the benefit of Lundsted's disclosure, the art can obtain surface active agents with properties which can be widely varied since both the hydrophobic and hydrophilic portions of the molecule can be altered by simply controlling the amounts of propylene oxide and ethylene oxide used in preparing the compounds. The compositions disclosed by Lundsted have opened the door for applications of nonionic surfactants derived from alkylene oxides in uncounted ways because of the new flexibility in chemical and physical properties that has been afforded.

Room for further improvement still exists, however. Even with the flexibility of chemical and physical properties afforded by the compositions of Lundsted wherein propylene oxide is initially condensed with a low molecular weight reactive hydrogen compound, and ethylene oxide in a solubilizing amount is then condensed therewith, we have found that specific combinations of properties desirable in a surfactant could not be attained in the compositions of Lundsted. Keeping in mind the extremely wide variety of uses of nonionic surface active agents, it can well be appreciated that new uses are encountered with increasing frequency wherein new combinations of properties are required. Particularly in the field of formulated detergent compositions, new combinations of such important properties as detergency, cloud point and foaming (or non-foaming) are desired which are not obtainable in any specific composition of Lundsted.

An object of this invention, therefore, is to provide mixtures of novel conjugated polyoxyethylene-polyoxypropylene compounds.

A further object is to provide new surface active agents derived from conjugated or "block" polymers of ethylene oxide and propylene oxide which have new combination of surface active properties.

A still further object is to provide a new method for preparing surface active agents derived essentially from ethylene oxide and propylene oxide.

As was stated above, the surface active agents disclosed by Lundsted are prepared by initially condensing propylene oxide with a low molecular weight reactive hydrogen compound, such as propylene glycol, so as to produce a hydrophobic polyoxypropylene polyol, and then condensing ethylene oxide with the hydrophobic polyoxypropylene polyol. We have discovered, however, that a completely new series of surface active agents, from the viewpoint of chemical and physical properties, can be obtained by reversing the order in which propylene oxide and ethylene oxide are employed in the compositions of Lundsted. Surprisingly, it has been found that when exactly the same amounts of propylene oxide and ethylene oxide are employed in preparing the compositions of Lundsted and in preparing the compositions of this invention where the order of condensation of propylene oxide and ethylene oxide is reversed, the surface active properties obtained in the compositions of this invention are completely different. In general, we have found that the cloud point and foam height of the compositions of this invention are significantly lower than the cloud point and foam height of the Lundsted compositions when comparisons are made between compositions prepared with the same weight of the same materials but differing in the order in which the propylene oxide and ethylene oxide are condensed. Detergency tests of the two classes of surfactants show varying results, but in every case the detergency of the composition of this invention is significantly different from the detergency of the strictly comparable composition of Lundsted.

Thus, it will be readily appreciated that a further advance in the surface active agent art is represented by the compositions of this invention since flexibility in chemical and physical properties is increased. Frequently, success or failure in the use of any particular surface active agent depends on the presence of a precise balance of surface active properties in the surfactant. The range of properties that can be obtained in the surfactants of Lundsted based on blocks of oxypropylene and oxyethylene chains has been significantly expanded by the present invention wherein the order of condensation of propylene oxide and ethylene oxide has been reversed.

Before discussing the new compositions and method of this invention in detail, it would be well to amplify the terms "mixtures," "conjugated" and "block" as used in this specification and in the appended claims to describe the compositions of the invention. It is well recognized in the field of alkylene oxide chemistry that when one subjects a reactive hydrogen compound to oxyalkylation, such as oxyethylation or oxypropylation, what is actually produced is a polymer of the alkylene oxide except for the terminal group. Furthermore, where the amount of the alkylene oxide employed is relatively large, one does not obtain a single molecular compound having a defined number of oxyalkylene radicals, but rather, one obtains a "mixture" of closely related homologues wherein the statistical average number of oxyalkylene groups equals the number of mols of the alkylene oxide employed and the individual members present in the mixture contain varying numbers of oxyalkylene groups. Thus, the compositions of this invention are "mixtures" of compounds which are defined by molecular weight and weight percent. When molecular weight is referred to in this specification and claims, there is meant the average theoretical molecular weight which equals the total of the grams of propylene oxide employed per mol of oxyethylene-reactive hydrogen compound condensate. In the examples of materials given herein according to the Lundsted patent, the theoretical molecular weight of the oxypropylene chain equals the total grams of propylene oxide per mol of reactive hydrogen compound.

The compositions of Lundsted and of this invention are such mixtures which are further defined as being "conjugated" or "block" polymers of alkylene oxides. Thus, compositions derived by condensing simultaneously about equal parts of ethylene oxide and propylene oxide, such as the lubricant compositions disclosed in Toussaint et al., U.S. 2,425,845, are distinguished since in the latter case a heteric oxyethylene-oxypropylene chain is obtained wherein the different oxyalkylene groups are distributed randomly throughout the oxyalkylene chain. On the other hand, the compositions of this invention contain a block of oxyalkylene groups in a chain connected to a block of different oxyalkylene groups in a chain thus providing the conjugated or repeated unit structure which is necessary for hydrophobic and hydrophilic properties. As has been noted hereinabove, the starting material for preparing the compositions of the invention is a low molecular weight reactive hydrogen compound. This fact is of the utmost importance in distinguishing the compositions of the invention from surface active agents of the prior art wherein alkylene oxides have been employed for various purposes. Lundsted was the first to disclose surface active compositions wherein the hydrophobic element derived its hydrophobic properties strictly from a defined oxypropylene chain. Compositions of the prior art wherein ethylene oxide is condensed with an initially water-insoluble, relatively high molecular weight and hydrophobic reactive hydrogen compound, or even where propylene oxide is initially condensed with such a starting material followed by oxyethylation, obviously cannot derive the hydrophobic characteristic necessary in a surface active agent from an oxyalkylene chain since such a characteristic is already provided by the starting material. For example, U.S. 2,552,532 discloses a series of compositions obtained by condensing, initially, ethylene oxide and, subsequently, propylene oxide with polypentaerythritols, such as tri-, tetra-, penta- and higher pentaerythritols. We have found that the lowest member of the series, tripentaerythritol, is sufficiently hydrophobic in itself so that a surfactant is obtained by merely condensing ethylene oxide therewith. The higher members of the series are even more hydrophobic and so such compositions are comparable to other alkylene oxide condensate surfactants of the prior art wherein a hydrocarbon radical supplies the hydrophobic characteristic for the surfactant and not the properly defined oxypropylene chains set forth in the compositions of this invention. So also in the compositions of this invention, the hydrophobic characteristic is directly attributable to the defined oxypropylene chains and the reactive hydrogen compound employed must not be sufficiently hydrophobic in itself so that a surfactant could be obtained merely by condensing a solubilizing amount of ethylene oxide therewith. If the latter type of reactive hydrogen compound were used, flexibility of properties would be largely lost since the hydrophobic characteristic of the surfactant would be dominated by the starting material.

It will be noted that the starting material-reactive hydrogen compound generally has very little effect on the properties of the compositions of the invention, since by definition, the reactive hydrogen compound cannot be one which contributes significantly to the hydrophobic characteristic of the composition. This is true in spite of the fact that a major distinction from the prior art in the compositions of the invention lies in the fact that a hereindefined reactive hydrogen compound is employed as discussed above. The reactive hydrogen compound used in preparing the compositions of this invention and in carrying out the method of the invention must fulfill two conditions, initially:

(1) Its reactive hydrogen atoms must be sufficiently labile to open the epoxide ring of ethylene oxide; and,
(2) The reactive hydrogen compound must react with methyl magnesium iodide to liberate methane in the classical Zerewitinoff reaction (see Niederl and Niederl, Micromethods of Quantitative Organic Analysis, page 263, John Wiley & Sons, New York City, 1946).

Furthermore, as stated hereinabove, the reactive hydrogen compound must be a relatively low molecular weight, water-soluble compound, such as one having up to about 6 carbon atoms, and must have at least 2, and preferably not more than about 6, reactive hydrogen atoms. It will be recognized, however, that a fairly broad range of reactive hydrogen compounds falls within this definition.

Thus, the lower molecular weight, aliphatic, polyhydric alcohols constitute one class of reactive hydrogen compounds that is especially useful in preparing the compositions of this invention. Such alcohols can have from about 2 to 6, inclusive, carbon atoms per molecule, and examples of these materials are ethylene glycol, propylene glycol, 2,3-butylene glycol, 1,3-butylene glycol, 1,5-pentanediol, 1,6-hexanediol, glycerol, trimethylolpropane, sorbitol, sucrose and the like. Another class of reactive hydrogen compounds that can be used is the alkylamines and alkylene polyamines having at least 2 reactive hydrogen atoms, such as methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides constitute a further class of such reactive hydrogen compounds, such as acetamide, succcinamide and benzenesulfonamide. A still further class of such reactive hydrogen compounds is the di- and polycarboxylic acids, such as adipic acid, succinic acid, glutaric acid, aconitic acid, diglycollic acid, and the like. It will be recognized that the reactive hydrogen compound can be one containing different functional groups having reactive hydrogen atoms, also, such as citric acid, glycollic acid, ethanolamine, and the like. Still other such reactive hydrogen compounds can also be used so long as the particular compound meets the requirement set forth, i.e., relatively low molecular weight, reactivity with ethylene oxide and at least 2 reactive hydrogen atoms.

The compositions of this invention are prepared by condensing a suitable reactive hydrogen compound with a defined weight of ethylene oxide to produce a polyoxyethylene polyol (within which we include the reactive hydogen compound) and subsequently condensing the thus produced polyoxyethylene polyol with propylene oxide so that the oxypropylene chains in the product mixture have a defined average molecular weight.

Since the reactive hydrogen compound employed has at least 2 reactive hydrogen atoms, the initially produced polyoxyethylene polyol corresponds to the structure, $$R[(C_2H_4O)_n]_xH$$

wherein R is the nucleus of the reactive hydrogen compound, $x$ is the number of oxyethylene chains attached to the reactive hydrogen compound nucleus at the sites of the reactive hydrogen atoms, and $n$ has a value such that the weight of oxyethylene groups constitutes from about 20 to 90 weight percent of the final oxyethylene-oxypropylene composition. Thus, where ethylene glycol is the chosen reactive hydrogen compound, the structure of the initially produced polyoxyethylene polyol is simply

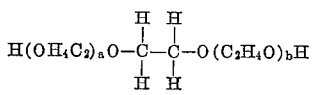

wherein $a+b$ is equal to $n$ defined above.

Where the reactive hydrogen compound chosen is ethylenediamine, the initially produced polyoxyethylene polyol has the structure,

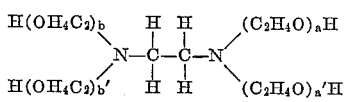

wherein $a+a'+b+b'$ is equal to $n$ defined above.

The final composition of the invention is produced by condensing propylene oxide with the polyoxyethylene polyol described above, and a sufficient quantity of propylene oxide is employed so that the molecular weight of each oxypropylene chain which is formed is at least 900. The lower limit on the molecular weight of the oxypropylene chains is significant in that at a molecular weight of about 900 an oxypropylene chain changes from essentially hydrophilic at lower molecular weights to hydrophobic at about 900 and higher molecular weights. This is demonstrated by the data and drawings in the Lundsted patent, particularly FIGURE 1, therein. Since each oxyethylene chain in the polyoxyethylene polyol contains a hydroxyl radical on its terminal carbon atom, the compositions of the invention have an oxypropylene chain attached to each oxyethylene chain, thus providing the "conjugated" or repeated unit or block polymer type of structure to which we referred earlier. The molecular weight of the oxypropylene chains can be up to about 25,000 or more and useful surfactant compositions of this invention are obtained throughout this range.

Thus, the structure of a composition of this invention corresponds to the formula

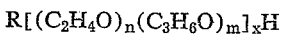

wherein $m$ has a value such that the oxypropylene chain has a molecular weight of at least about 900, such as about 900 to 25,000, and wherein $n$ and $x$ have the significance ascribed to them hereinabove. Where the reactive hydrogen compound employed is ethylene glycol, the composition of the invention has the structure,

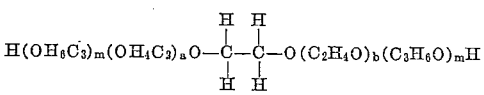

wherein $a+b$ equals $n$ which is a value such that the weight of the oxyethylene chains constitutes about 20 to 90 weight percent of the total composition, and $m$ is a value such that the average molecular weight of each oxypropylene chain is at least about 900 to 25,000.

The compositions of this invention have the most desirable combination of properties for use as detergents when the oxyethylene chains constitute about 25 to 75 weight percent of the total compositions and wherein the molecular weight of the oxypropylene chains is about 1500 to 15,000, and compositions falling within these limitations are preferred by us for many uses.

Our invention set forth herein can also be stated in terms of the new method by which the compositions of the invention are prepared. The conditions and catalyst employed are those conventionally employed in alkylene oxide condensation reactions. However, our method which comprises condensing ethylene oxide with a relatively low molecular weight reactive hydrogen compound containing at least 2 reactive hydrogen atoms to form a polyoxyethylene polyol and thereafter condensing propylene oxide with said polyoxyethylene polyol, the amount of ethylene oxide employed being sufficient so that the polyoxyethylene polyol constitutes about 20 to 90 weight percent of the final composition and the amount of propylene oxide employed being sufficient so that the oxypropylene chains have an average molecular weight of about 900 to 25,000, is believed to express our invention in terms of the method steps employed.

As has been stated, the actual conditions employed in carrying out the alkylene oxide condensation reactions which are necessary in order to obtain the compositions and to carry out the method of the invention are well known in the art. The disclosure of Lundsted in U.S. 2,674,619, columns 4 and 5, sets these conditions forth and this disclosure in combination with the disclosure in our examples to follow describes the alkylene oxide reactions adequately. The compositions of this invention are particularly useful as detergents and tests which we have made on the compositions of the invention to show their usefulness as detergents include the Carbon Soil Removal Test described in U.S. 2,674,619, column 6, lines 18–75, and column 7, lines 1–49. The result of this test is a Carbon Soil Removal value taken at either 90° F. or 140° F. for the test composition which expresses its detergency in terms of its percentage effectiveness when compared to the standard 0.25% solution of sodium kerylbenzenesulfonate described in the test procedure referred to above. Other tests which we have made relate to the cloud point of the compositions and the foam height produced by the compositions under controlled conditions.

The cloud point test is carried out by heating a 10 weight percent solution of the test composition in distilled water in a test tube placed in a water bath. The water bath is gradually heated at a rate of about one degree a minute and so that the bath temperature is not more than 5–10 degrees centigrade higher than the test solution particularly near the cloud point. The test solution is agitated by a low-speed propeller-type stirrer and the cloud point observation of the test solution is made against a dark background. The cloud point is taken as the temperature at which definite milky striations or minute but discrete particles of a separate phase are observed.

The foam height test is carried out by placing 10 liters of a 0.10 weight percent solution of the test composition in tap water in a Pyrex glass jar measuring 10″ in diameter and 10″ in height. The Pyrex jar is equipped with a propeller-type stirrer, knife blade heaters, a thermoregulator and a thermometer. A small, centrifugal pump is arranged to circulate the solution in the jar through a calibrated glass flow meter to a jet orifice prepared from the base of a No. 20 Becton, Dickinson and Company hypodermic needle by enlarging the hole in the base with a No. 56 twist drill. The jet orifice is mounted coaxially inside a Pyrex glass tube (51 mm. by 910 mm.) which is placed vertically in the solution. The jet is arranged so that it is 600 mm. above the surface of the solution in the jar, and the Pyrex glass tube is arranged so as to project 210 mm. below the surface of the solution. The test solution is heated to and maintained at 120° F. The centrifugal pump is started and a flow rate of 200–400 ml. per minute of the solution is metered through the jet. The flow is adjusted by by-passing part of the solution stream back into the jar before passage through the flow meter. The solution passing through the jet is directed against the wall of the vertical tube while the flow is adjusted and while the temperature is brought to equilibrium in order to prevent foaming prior to the actual test. The jet is then arranged so as to pass the solution coaxially downward through the tube without touching the tube walls to impinge upon the surface of the solution located in the Pyrex tube. Time is measured from the instant the solution impinges on the liquid surface and the resulting foam is measured at the end of 10 minutes. The foam height readings are obtained from a calibration on the outside of the Pyrex tube with the zero mark at the surface of the solution and are expressed in millimeters.

We have found that the compositions of this invention have entirely different combinations of these three detergency properties, carbon soil removal value, cloud point and foam height, than the compositions of the Lundsted patent. Generally, the compositions of this invention have significantly lower cloud points and foam heights and these trends in combination with the distinctly different carbon soil removal values make our compositions a definite advance in the art since flexibility in properties of surfactants based on alkylene oxide block polymers is increased. These facts will become apparent from the examples which follow and particularly the direct comparisons of the properties of the compositions of the invention and the compositions of the Lunsted patent. The examples are supplied in order to exemplify the compositions and method of the invention and should not be employed to unduly limit the scope of our invention when due regard is given to the description given hereinabove and to follow.

EXAMPLES

A series of surfactant compositions was prepared employing reactive hydrogen compounds exemplary of the classes of such materials disclosed hereinabove in accordance with this invention. The procedure which exemplifies the method of this invention was generally the same throughout although variations in operating conditions and equipment were made to a certain extent in order to expedite the reactions and because of volume limitations dictated by the reactors employed.

The reactors employed were a one gallon, stainless steel autoclave equipped with a stirrer, thermocouple, pressure gage and reactant inlet tube whose outlet was directly under the stirrer; and, in some cases, a 3-necked glass flask equipped with a stirrer, condenser, thermometer and alkylene oxide inlet tube. The exact conditions, materials and weights of materials used are summarized in Table I below. In general, the reactive hydrogen compound and catalyst were initially charged into the reactor. The amount of catalyst charged to the reactor at the start of each stage is indicated in Table I and a dash (—) means that no additional catalyst was used. In the runs where N-methylmorpholine or water was used as a solvent-catalyst, the reactor was washed and dried following removal of the first stage product before charging KOH catalyst for the second and subsequent stages. Also, in those runs where N-methylmorpholine or water was used in the first stage, the product of the first stage was stripped at 100° C. and about 4 mm. Hg pressure for 1 hour before charging a portion of this product to the second stage.

Ethylene oxide was then admitted to the reactor while maintaining a reaction temperature in the range of 60–135° C. and average pressure of 1–95 p.s.i.g. The total reaction time varied from about 2–11 hours. Because of volume limitations imposed by the reactors, the polyoxyethylene polyol was made in stages, taking the indicated amount of the product of the first stage, charging it back into the reactor for further reaction with ethylene oxide as indicated. When the polyoxyethylene polyol having the desired weight of oxyethylene groups was obtained after reaction of the reactive hydrogen compound with ethylene oxide in 3 or 4 stages, the indicated amount of the intermediate polyoxyethylene polyol was then charged to the reactor together with KOH as catalyst and propylene oxide was then admitted under the indicated reaction conditions in the amount necessary to obtain oxypropylene chains having the total theoretical molecular weight stated in the table. Compositions according to this invention were thus prepared and the reaction conditions are set forth below in Table I.

TABLE I

Compositions of Invention
Reactive Hydrogen Compound + Ethylene Oxide + Propylene Oxide
Quantities of Reactants and Reaction Conditions

| Ex. No. | Reactive Hydrogen Compound (RHC) Used | Amount RHC (or oxyalkylene condensate from previous stage) Used, Grams (mols) Stage | | | | Amount Catalyst Used, Grams Stage | | | | Amount Ethylene Oxide (EO) or Propylene Oxide (PO) Added, Grams (mols) Stage | | | | Total Reaction Time, Hours Stage | | | | Average Temperature, °C. Stage | | | | Average Pressure, psig Stage | | | |
|---|---|---|---|---|---|---|---|---|---|---|---|---|---|---|---|---|---|---|---|---|---|---|---|---|---|
| | | A | B | C | D | A | B | C | D | A | B | C | D | A | B | C | D | A | B | C | D | A | B | C | D |
| 1 | Ethylene glycol | 400 (6.45) | A–1030 (2.35) | B–507 (0.57) | C–600 (0.20) | (a) 28.3 | (a) 10.3 | --- | (a) 1.0 | EO–2434 (55.3) | EO–1303 (29.7) | EO–1118 (25.4) | PO–1200 (20.7) | 3.5 | 2.3 | 2.0 | 3.5 | 105 | 107 | 115 | 140 | 65 | 65 | 80 | 70 |
| 2 | Ethylene glycol | 372 (6) | A–100 (0.32) | A–85 (0.28) | B–151 (0.05) | (a) 4.8 | --- | --- | (b) 1.2 | EO–1439 (32.7) | EO–879 (20) | EO–919 (20.9) | PO–266 (4.6) | --- | 17 | 22 | 21 | 115 | 125 | 120 | 125 | atmos. | atmos. | atmos. | atmos. |
| | Stage E | | C–271 (0.08) | | | | (a) 1.2 | | | | PO–225 (3.88) | | | | 25 | | | | 120 | | | | atmos. | | |
| 3 | Ethylene glycol | 400 (6.5) | A–1030 (2.3) | B–547 (0.5) | | (a) 28.3 | (a) 10.3 | (a) 1.8 | | EO–2434 (55.3) | EO–1303 (29.7) | PO–559 (9.6) | | 3.5 | 2.3 | 4.0 | | 105 | 107 | 120 | | 65 | 65 | 70 | |
| 4 | Ethylene glycol | 400 (6.5) | A–495 (1.1) | B–600 (0.3) | | (a) 28.3 | (a) 5.0 | (a) 1.0 | | EO–2434 (55.3) | EO–1764 (40.1) | PO–1200 (20.7) | | 3.5 | 3.5 | 3.5 | | 105 | 108 | 142 | | 65 | 75 | 70 | |
| 5 | Ethylene glycol | 400 (6.5) | A–1030 (2.34) | B–567 (0.6) | C–463 (0.2) | (a) 28.3 | (a) 10.3 | (a) 1.9 | (a) 0.5 | EO–2434 (55.3) | EO–1303 (29.7) | EO–1118 (25.4) | PO–484 (8.0) | 3.5 | 2.3 | 2.0 | 5.8 | 105 | 107 | 115 | 142 | 65 | 65 | 80 | 75 |

TABLE I (contd.)

| Ex. No. | Reactive Hydrogen Compound (RHC) Used | Amount RHC (or oxyalkylene condensate from previous stage) Used, Grams (mols) | | | | Amount Catalyst Used, Grams | | | | Amount Ethylene Oxide (EO) or Propylene Oxide (PO) Added, Grams (mols) | | | | Total Reaction Time, Hours | | | | Average Temperature, °C. | | | | Average Pressure, psig | | | |
|---|---|---|---|---|---|---|---|---|---|---|---|---|---|---|---|---|---|---|---|---|---|---|---|---|---|
| | | A | B | C | D | A | B | C | D | A | B | C | D | A | B | C | D | A | B | C | D | A | B | C | D |
| 6 | Ethylene glycol | 400 (6.5) | A- 1030 (2.3) | B- 567 (0.6) | C- 605 (0.2) | (a) 28.3 | (a) 10.3 | (a) 1.9 | (a) 0.7 | EO- 2434 (55.3) | EO- 1303 (29.7) | EO- 1118 (25.8) | PO- 1210 (20.9) | 3.5 | 2.3 | 2.0 | 5.0 | 105 | 107 | 115 | 148 | 65 | 65 | 80 | 78 |
| 7 | 1,5-Pentanediol | 178 (1.7) | A- 374 (1.56) | B- 900 (0.54) | C- 700 (0.23) | (c) 16.0 | --- | --- | --- | EO- 230 (4.0) | EO- 2248 (50.6) | EO- 710 (16.05) | PO- 1400 (24.1) | 3.3 | 10.3 | 2.9 | 6.8 | 110 | 135 | 125 | 125 | 1-2 | 85 | 65 | 75 |
| 8 | Glycerine | 460 (5.0) | A- 450 (0.82) | B- 1200 (0.34) | | (c) 47 | --- | --- | --- | EO- 2290 (52.0) | EO- 2415 (55.0) | PO- 1370 (23.6) | | 4.9 | 7.6 | 5.3 | | 125 | 125 | 125 | | 30 | 47 | 40 | |
| 9 | Trimethylolpropane | 400 (2.98) | A- 450 (0.6) | B- 1167 (0.25) | C- 614 (0.06) | (c) 29 | --- | --- | --- | EO- 1848 (47.0) | EO- 2350 (53.5) | EO- 1333 (30.3) | PO- 307 (5.3) | 4.9 | 6.8 | 4.3 | 4.5 | 125 | 125 | 135 | 135 | 50 | 70 | 80 | 90 |
| 10 | Pentaerythritol | 545 (4) | A- 400 (1.29) | B- 900 (0.43) | C- 900 (0.19) | (d) 410 | (c) 12.1 | --- | --- | EO- 704 (16.0) | EO- 2315 (52.6) | EO- 1160 (27.0) | PO- 1780 (30.7) | 2.9 | 11.6 | 4.3 | 7.1 | 125 | 125 | 125 | 135 | 50 | 90 | 65 | 85 |
| 11 | n-Butylamine | 257 (3.5) | A- 380 (2.2) | B- 800 (0.6) | | (e) 84 | (c) 20.4 | --- | | EO- 310 (7.0) | EO- 2370 (53.8) | PO- 1600 (27.6) | | 4.3 | 7.1 | 6.1 | | 60 | 125 | 125 | | 1-2 | 75 | 40 | |
| 12 | Ethylenediamine | 141 (2) | A- 354 (1.5) | B- 600 (0.4) | C- 700 (0.1) | (e) 21 | (c) 15.6 | --- | --- | EO- 352 (8) | EO- 1860 (42.3) | EO- 1360 (30.9) | PO- 860 (14.8) | 2.5 | 6.5 | 5.6 | 3.6 | 95 | 125 | 125 | 125 | 2-3 | 65 | 55 | 60 |
| 13 | 1,6-Hexanediamine | 252 (2) | A- 400 (1.4) | B- 706 (0.37) | C- 651 (0.11) | (e) 90 | (c) 12.9 | (c) 3.4 | --- | EO- 352 (8.0) | EO- 2184 (49.6) | EO- 1553 (35.4) | PO- 1303 (22.9) | 6.5 | 18.6 | 7.8 | 5.6 | 95 | 135 | 125 | 125 | 1-2 | 95 | 70 | 75 |
| 14 | Diethylenetriamine | 206 (1.41) | A- 400 (1.3) | B- 900 (0.4) | C- 800 (0.2) | (e) 33 | (c) 11.9 | --- | --- | EO- 194 (4.4) | EO- 2390 (54.2) | EO- 1150 (26.1) | PO- 1600 (27.6) | 3.8 | 7.9 | 4.5 | 8.0 | 90 | 125 | 128 | 125 | 1-2 | 65 | 60 | 80 |
| 15 | 2-Methylpiperazine | 300 (3.0) | A- 400 (2.1) | B- 704 (0.6) | | (e) 35.3 | (c) 19.9 | --- | | EO- 264 (6.0) | EO- 2270 (51.6) | PO- 1408 (24.3) | | 7.0 | 9.6 | 5.8 | | 85 | 125 | 125 | | 2 | 85 | 55 | |
| 16 | Acetamide | 200 (3.4) | A- 400 (2.7) | B- 800 (0.8) | C- 800 (0.3) | (c) 31.7 | --- | --- | --- | EO- 298 (6.8) | EO- 2320 (52.5) | EO- 1600 (36.4) | PO- 1600 (27.6) | 3.8 | 10.0 | 5.8 | 6.4 | 85 | 125 | 125 | 125 | 2 | 85 | 75 | 65 |
| 17 | Benzenesulfonamide | 343 (2.2) | A- 400 (1.6) | B- 800 (0.5) | C- 500 (0.2) | (d) 170 | (c) 15.3 | --- | --- | EO- 193 (4.4) | EO- 2220 (50.5) | EO- 1250 (28.4) | PO- 1040 (18.0) | 2.8 | 8.1 | 4.9 | 5.3 | 100 | 125 | 125 | 125 | 2 | 85 | 55 | 75 |

Note.-- Catalysts: (a) Sodium hydroxide, (b) metallic sodium, (c) potassium hydroxide, (d) N-methyl morpholine, (e) water.

Thus, Table I above summarizes the conditions under which surfactant compositions according to the present invention were prepared. These compositions are summarized in Table II below which reports the reactive hydrogen compound used, the weight percent of the total composition attributable to the oxyethylene groups and the total theoretical molecular weight of the oxypropylene chains. Since these compositions were prepared in stages, the examples are identified by Example No. and Stage B, C, D, etc. which stand for the preparation of the particular composition. It will be noted that two compositions were prepared under Example 2 in Table I, they being represented by Stages D and E in Example 2.

Table II
COMPOSITION OF INVENTION

| Example No.—Stage | Reactive hydrogen compound | Oxyethylene groups, weight percent | Oxypropylene chains, molecular weight |
|---|---|---|---|
| 1—D | Ethylene glycol | 33.3 | 5,920 |
| 2—D | do | 35.9 | 4,940 |
| 2—E | do | 54.1 | 2,710 |
| 3—C | do | 48.1 | 1,024 |
| 4—C | do | 33.0 | 4,018 |
| 5—D | do | 49.5 | 2,985 |
| 6—D | do | 24.9 | 8,955 |
| 7—D | 1,5-pentanediol | 33.0 | 6,000 |
| 8—C | Glycerine | 46.0 | 4,000 |
| 9—D | Trimethylolpropane | 66.1 | 5,000 |
| 10—D | Pentaerythritol | 33.2 | 9,500 |
| 11—C | n-Butylamine | 32.8 | 2,500 |
| 12—D | Ethylenediamine | 44.7 | 6,000 |
| 13—D | 1,6-hexanediamine | 33.2 | 12,000 |
| 14—D | Diethylenetriamine | 33.2 | 10,000 |
| 15—B | 2-methylpiperazine | 31.6 | 2,500 |
| 16—D | Acetamide | 33.1 | 6,000 |
| 17—D | Benzenesulfonamide | 31.8 | 5,200 |

A parallel series of surfactant compositions according to the Lundsted patent, U.S. 2,674,619, was also prepared wherein the reactive hydrogen compound was initially condensed with propylene oxide and the thus produced polyoxypropylene polyol was then condensed with ethylene oxide. These compositions were prepared with the proper amount of propylene oxide and ethylene oxide so that the weight percent oxyethylene groups and molecular weight of the oxypropylene chains were the same as these values present in many of the compositions according to this invention summarized above in Tables I and II. Thus, direct comparisons were then possible and were made so as to demonstrate the difference in detergency properties between the compositions of the invention and the compositions of the Lundsted patent.

The compositions according to the Lundsted patent were prepared in stages following the same general procedure and with the same equipment as that already described for the compositions of the invention summarized in Tables I and II. The significant difference from the method employed in the examples recorded in Tables I and II is, of course, that the reactive hydrogen compound was initially condensed with propylene oxide in the examples in Table III rather than ethylene oxide in accordance with this invention. The preparation of the compositions of the Lundsted patent is summarized below in Table III.

TABLE III

Compositions of Lundsted Patent
Reactive Hydrogen Compound + Propylene Oxide + Ethylene Oxide
Quantities of Reactants and Reaction Conditions

| Ex. No. | Reactive Hydrogen Compound (RHC) Used | Amount RHC (or oxyalkylene condensate from previous stage) Used, Grams (mols) Stage | | | | Amount Catalyst Used, Grams Stage | | | | Amount Ethylene Oxide (EO) or Propylene Oxide (PO) Added, Grams (mols) Stage | | | | Total Reaction Time, Hours Stage | | | | Average Temperature, °C. Stage | | | | Average Pressure, psig Stage | | | |
|---|---|---|---|---|---|---|---|---|---|---|---|---|---|---|---|---|---|---|---|---|---|---|---|---|---|
| | | A | B | C | D | A | B | C | D | A | B | C | D | A | B | C | D | A | B | C | D | A | B | C | D |
| 18 | Propylene glycol | 404 (5.3) | A-958 (2.0) | B-1013 (0.9) | | (a) 17.0 | | | | PO-2115 (36.4) | PO-1183 (20.4) | EO-1013 (22.0) | | 4.0 | 4.1 | 2.7 | | 125 | 125 | 125 | | 26 | 38 | 81 | |
| 19 | Propylene glycol | 342.6 (4.5) | A-327 (0.6) | B-1024 (0.2) | | (a) 53.4 | | | | PO-2245 (38.8) | PO-2027 (35.0) | EO-552 (12.5) | | 4.5 | 4.8 | 2.6 | | 125 | 125 | 125 | | 30 | 64 | 49 | |
| 20 | Propylene glycol | 228 (3.0) | A-724 (30.2) | B-1000 (0.3) | | (a) 20.0 | | | | PO-2808 (48.4) | PO-1750 (30.2) | EO-1000 (22.7) | | 10.8 | 4.8 | 4.3 | | 125 | 125 | 125 | | 55 | 55 | 60 | |
| 21 | Propylene glycol | 447 (5.2) | A-449 (0.9) | B-833 (0.3) | C-1682 (2.8) | (c) 49.0 | | | | PO-2050 (36.1) | PO-2160 (37.3) | PO-1000 (17.3) | PO-841 (14.5) | 4.6 | 5.5 | 6.0 | 9.2 | 125 | 125 | 125 | 125 | 5 | 40 | 52 | 70 |
| | Stage E | | | | D-500 (0.1) | E | | | | E | | | EO-167 (3.8) | E | | | 3.9 | E | | | 125 | E | | | 82 |
| 22 | 1,5-Pentanediol | 177.9 (1.7) | A-400 (1.7) | B-800 (0.5) | C-1400 (0.3) | (c) 16.0 | | | | PO-232 (4.0) | PO-2435 (42) | PO-2035 (40.5) | EO-700 (15.9) | 6.5 | 9.1 | 7.9 | 4.5 | 120 | 125 | 130 | 130 | 1-2 | 45 | 65 | 75 |
| 23 | Glycerine | 460 (5) | A-400 (0.7) | B-1200 (0.3) | | (c) 47.0 | | | | PO-2290 (39.5) | PO-2510 (43.3) | EO-1050 (24.0) | | 7.0 | 9.6 | 3.7 | | 125 | 125 | 125 | | 60 | 90 | 80 | |
| 24 | Trimethylolpropane | 400 (3.0) | A-425 (0.6) | B-950 (0.2) | | (c) 29 | | | | PO-1850 (31.9) | PO-2410 (41.5) | EO-1900 (32.8) | | 5.8 | 7.3 | 5.3 | | 125 | 125 | 135 | | 25 | 75 | 75 | |
| 25 | Pentaerythritol | 545 (4.0) | A-500 (1.4) | B-500 (0.3) | C-950 (0.1) | (d) 410 | (c) 12.8 | | | PO-928 (16.0) | PO-2240 (38.6) | PO-1875 (32.4) | EO-480 (10.9) | 3.8 | 8.1 | 6.8 | 2.6 | 125 | 125 | 135 | 135 | 50 | 65 | 100 | 75 |
| 26 | n-Butylamine | 1460 (20) | A-400 (2.1) | B-800 (0.8) | C-800 (0.3) | (e) 50.0 | (c) 19.8 | | | PO-2320 (40) | PO-1720 (29.7) | PO-1200 (20.7) | EO-400 (9.1) | 8.8 | 6.8 | 4.8 | 2.1 | 90 | 125 | 125 | 125 | 2 | 25 | 55 | 50 |
| 27 | Ethylenediamine | 300 (5.0) | A-584 (2.0) | B-250 (0.2) | --* | (e) 35.3 | (a) 13.3 | | | PO-1160 (20) | PO-1756 (30.3) | PO-1032 (17.8) | EO-1048 (23.8) | 6.5 | 4.8 | 7.8 | 5.4 | 95 | 125 | 125 | 125 | 2 | 25 | 80 | 80 |
| 28 | 1,6-Hexanediamine | 1156 (10) | A-400 (1.1) | B-450 (0.2) | C-950 (0.1) | (e) 346 | (c) 10.7 | | | PO-2308 (39.8) | PO-2400 (41.4) | PO-2125 (36.6) | EO-475 (10.8) | 5.8 | 8.9 | 9.3 | 2.6 | 95 | 125 | 135 | 135 | 2 | 55 | 70 | 75 |
| 29 | Diethylenetriamine | 206 (1.4) | A-400 (1.0) | B-700 (0.3) | C-950 (0.1) | (e) 35.0 | (c) 9.4 | | | PO-2650 (45.6) | PO-2400 (41.4) | PO-1800 (31.0) | EO-475 (10.8) | 6.0 | 8.8 | 12.1 | 3.8 | 95 | 125 | 135 | 135 | 2 | 70 | 85 | 85 |
| 30 | 2-Methylpiperazine | 300 (3.0) | A-500 (2.3) | B-879 (0.8) | C-800 (0.3) | (e) 35.3 | (c) 21.7 | | | PO-348 (6.0) | PO-2280 (39.3) | PO-952 (16.4) | EO-400 (9.1) | 8.0 | 8.3 | 4.4 | 1.5 | 85 | 125 | 125 | 125 | 2 | 40 | 75 | 65 |
| 31 | Acetamide | 177.2 (3.0) | A-400 (2.3) | B-400 (0.4) | C-800 (0.1) | (c) 28.0 | | | | PO-348 (6.0) | PO-2200 (38.0) | PO-1715 (13.3) | EO-400 (9.1) | 6.8 | 8.9 | 7.7 | 2.9 | 85 | 125 | 135 | 135 | 2 | 35 | 90 | 85 |
| 32 | Benzenesulfonamide | 235 (1.5) | A-326 (1.2) | B-400 (0.2) | --* | (d) 118 | (c) 11.0 | | | PO-174 (3.0) | PO-2080 (36.0) | PO-630 (10.9) | EO-495 (11.3) | 5.8 | 10.9 | 4.3 | 2.8 | 100 | 125 | 125 | 125 | 2 | 50 | 65 | 65 |

* The oxyalkylene condensate charged was total product of previous stage which was not separately weighed and recharged.

Note. Catalysts: (a) Sodium hydroxide, (c) Potassium hydroxide, (d) N-methylmorpholine, (e) Water.

The compositions of the Lundsted patent which were prepared in order to make direct comparisons with the compositions of the invention are summarized in Table IV showing the reactive hydrogen compound used, the molecular weight of the oxypropylene chains and the weight percent of each composition attributable to the oxyethylene groups.

Compositions according to this invention summarized in Table II and compositions according to the Lundsted patent summarized in Table IV were tested for detergency as reflected by their carbon soil removal values as well as for cloud points and foam heights according to the procedures set forth for these tests. The results of these comparison tests are set forth in Table V.

Table IV
COMPOSITIONS OF LUNDSTED PATENT (2,674,619)

| Example No.—Stage | Reactive Hydrogen Compound | Oxypropylene Chains, Molecular Weight | Oxyethylene Groups, Weight Percent |
|---|---|---|---|
| 18—C | Propylene glycol | 1,075 | 48.3 |
| 19—C | do | 4,126 | 34.4 |
| 20—C | do | 3,200 | 49.4 |
| 21—E | do | 9,150 | 24.9 |
| 22—D | 1,5-pentanediol | 6,000 | 33.0 |
| 23—C | Glycerine | 4,000 | 46.0 |
| 24—C | Trimethylolpropane | 5,000 | 66.1 |
| 25—D | Pentaerythritol | 9,500 | 33.2 |
| 26—D | n-Butylamine | 2,500 | 32.8 |
| 27—D | Ethylenediamine | 6,000 | 44.7 |
| 28—D | 1,6-hexanediamine | 12,000 | 33.2 |
| 29—D | Diethylenetriamine | 10,000 | 33.2 |
| 30—D | 2-methylpiperazine | 2,500 | 31.6 |
| 31—D | Acetamide | 6,000 | 33.1 |
| 32—D | Benzenesulfonamide | 5,200 | 31.8 |

Table V

COMPARISON OF DETERGENCY, FOAM HEIGHT AND CLOUD POINT PROPERTIES BETWEEN COMPOSITIONS OF INVENTION AND COMPOSITIONS OF LUNDSTED PATENT (U.S. 2,674,619)

| Ex. No. | Reactive hydrogen compound | Composition of invention | | Composition of Lundsted patent | | Carbon soil removal value at— | | Foam height, at 120° F. and 400 ml./min. flow rate, mm. | Cloud point, °C. |
|---|---|---|---|---|---|---|---|---|---|
| | | Oxyethylene groups, weight percent | Oxypropylene chains, molecular weight | Oxypropylene chains, molecular weight | Oxyethylene groups, weight percent | 90° F. | 140° F. | | |
| 3 | Ethylene glycol | 48.1 | 1,024 | | | | 52 | (¹) | 40 |
| 18 | ----do---- | | | 1,075 | 48.3 | | 134 | 145 | 79 |
| 4 | Ethylene glycol | 33.0 | 4,018 | | | | 284 | 15 | 13 |
| 19 | ----do---- | | | 4,126 | 34.4 | | 193 | 65 | 44 |
| 5 | Ethylene glycol | 49.5 | 2,985 | | | | 150 | 37 | 17 |
| 20 | ----do---- | | | 3,200 | 49.5 | | 243 | >600 | 79 |
| 6 | Ethylene glycol | 24.9 | 8,955 | | | | 261 | 27 | 7 |
| 21 | ----do---- | | | 9,150 | 24.9 | | 114 | 42 | 10 |
| 7 | 1,5-pentanediol | 33.0 | 6,000 | | | 134 | 152 | 60 | 11.5 |
| 22 | ----do---- | | | 6,000 | 33.0 | 144 | 124 | 70 | 53.5 |
| 8 | Glycerine | 46.0 | 4,000 | | | 98 | 217 | 30 | 15.0 |
| 23 | ----do---- | | | 4,000 | 46.0 | 172 | 183 | ² 395 | 74.3 |
| 9 | Trimethylolpropane | 66.1 | 5,000 | | | 81 | 125 | 20 | 0.9 |
| 24 | ----do---- | | | 5,000 | 66.1 | 130 | 150 | ² 290 | None |
| 10 | Pentaerythritol | 33.2 | 9,500 | | | 180 | 192 | 47 | 12.5 |
| 25 | ----do---- | | | 9,500 | 33.2 | 145 | 117 | 555 | 39.5 |
| 11 | n-Butylamine | 32.8 | 2,500 | | | 132 | (¹) | 10 | 17.5 |
| 26 | ----do---- | | | 9,500 | 33.2 | 286 | 280 | 40 | 59.5 |
| 12 | Ethylenediamine | 44.7 | 6,000 | | | 162 | (¹) | 27 | 19.5 |
| 27 | ----do---- | | | 6,000 | 44.7 | 258 | 240 | (¹) | 71.0 |
| 13 | 1,6-hexanediamine | 33.2 | 12,000 | | | (¹) | (¹) | 30 | 11.5 |
| 28 | ----do---- | | | 12,000 | 33.2 | 243 | 123 | 590 | 87.0 |
| 14 | Diethylenetriamine | 33.2 | 10,000 | | | 206 | (¹) | 35 | 12.0 |
| 29 | ----do---- | | | 10,000 | 33.2 | 272 | 143 | 560 | 50.0 |
| 15 | Dihydroxy-2-methylpiperazine | 31.6 | 2,500 | | | 144 | (¹) | 12 | 19.0 |
| 30 | ----do---- | | | 2,500 | 31.6 | 200 | 285 | 235 | 23.0 |
| 16 | Acetamide | 33.1 | 6,000 | | | 172 | 163 | 45 | 11.0 |
| 31 | ----do---- | | | 6,000 | 33.1 | 246 | 226 | 47 | 37.5 |
| 17 | Benzenesulfonamide | 31.8 | 5,200 | | | 192 | 192 | 35 | 9.0 |
| 32 | ----do---- | | | 5,200 | 31.8 | 218 | 168 | 32 | 38.5 |

¹ Not determined.  ² Flow rate was 300 ml./min.

It will be apparent from a review of the data recorded in Table V that the major objective of this invention has been accomplished. That is, flexibility in the properties of surface active agents based on block polymers of propylene oxide and ethylene oxide has been significantly increased by our concept of initially condensing ethylene oxide with a relatively low molecular weight reactive hydrogen compound having a plurality of reactive hydrogen atoms and then condensing propylene oxide with the initially produced polyoxyethylene polyol. The tests made and results thereof which are recorded in Table V show unmistakably that the compositions of this invention have distinctly different properties than the compositions of the Lundsted patent wherein the relatively low molecular weight reactive hydrogen compound is initially condensed with propylene oxide and the thus produced polyoxypropylene polyol is then condensed with ethylene oxide. Furthermore, definite trends can be seen upon close review of the data in Table V. Cloud point is consistently lower and foam height is consistently lower with the compositions of this invention. Detergency as measured by the carbon soil removal test varies; in some cases the compositions of the invention produced significantly higher carbon soil removal values than did the compositions of the Lundsted patent, e.g., Examples 4, 6, 8 and 10 compared to Examples 19, 21, 23 and 25, respectively, while in other cases the compositions of the Lundsted patent produced higher carbon soil removal values. In any case, an entirely different composition from the point of view of chemical and physical properties is produced according to the concept of this invention. The comparisons are made, it should be noted, between pairs of compositions where essentially the same amounts of the same ingredients were used with sole significant difference residing in the molecular structure which results from the order in which propylene oxide and ethylene oxide were used in making the compositions.

We claim:

1. A surface active mixture of conjugated polyoxyethylene-polyoxypropylene compounds containing in their structure the nucleus of a relatively low molecular weight reactive hydrogen compound having from 2 to about 6 reactive hydrogen atoms and having not over 6 carbon atoms per molecule and being selected from the group consisting of aliphatic polyhydric alcohols, alkylamines, alkylene polyamines, cyclicamines, amides, and polycarboxylic acids, oxyethylene groups and oxypropylene groups, the structure of the compounds being such that all of the oxyethylene groups are present in polyoxyethylene chains that are attached to the nucleus of the reactive hydrogen compound at the sites of the reactive hydrogen atoms, and all of the oxypropylene groups are present in polyoxypropylene chains that are attached to the polyoxyethylene chains, the average molecular weight of the oxypropylene chains being at least about 900 and up to about 25,000, and the oxyethylene groups in the mixture constituting from about 20 to 90 weight percent of the mixture.

2. A surface active mixture of conjugated polyoxyethylene-polyoxypropylene compounds containing in their structure the nucleus of a relatively low molecular weight reactive hydrogen compound having from 2 to about 6 reactive hydrogen atoms and having not over 6 carbon atoms per molecule and being selected from the group consisting of aliphatic polyhydric alcohols, alkylamines, alkylene polyamines, cyclicamines, amides, and polycarboxylic acids, oxyethylene groups and oxypropylene groups, the structure of the compounds being such that all of the oxyethylene groups are present in polyoxyethylene chains that are attached to the nucleus of the reactive hydrogen compound at the sites of the reactive hydrogen atoms, and all of the oxypropylene groups are present in polyoxypropylene chains that are attached to the polyoxyethylene chains, the average molecular weight of the oxypropylene chains being from 1500 to 15,000, and the oxyethylene groups in the mixture constituting from about 25 to 75 weight percent of the mixture.

3. A surface active mixture of conjugated polyoxyethylene-polyoxypropylene compounds according to claim 2 wherein said reactive hydrogen compound is an aliphatic polyhydric alcohol.

4. A surface active mixture of conjugated polyoxyethylene-polyoxypropylene compounds according to claim 2 wherein said reactive hydrogen compound is an alkylamine.

5. A surface active mixture of conjugated polyoxyethylene-polyoxypropylene compounds according to claim 2 wherein said reactive hydrogen compound is an alkylene polyamine.

6. A surface active mixture of conjugated polyoxyethylene-polyoxypropylene compounds according to claim 2 wherein said reactive hydrogen compound is an amide.

7. A surface active mixture of conjugated polyoxyethylene-ployoxypropylene compounds according to claim 2 wherein said reactive hydrogen compound is a polycarboxylic acid.

8. A surface active mixture of conjugated polyoxyethylene-polyoxypropylene compounds containing in their structure the nucleus of ethylene glycol, oxyethylene groups and oxypropylene groups, the structure of the compounds being such that all of the oxyethylene groups are present in polyoxyethylene chains that are attached to the nucleus of the ethylene glycol at the sites of its reactive hydrogen atoms, and all of the oxypropylene groups are present in polyoxypropylene chains that are attached to the polyoxyethylene chains, the average molecular weight of the oxypropylene chains being at least about 900 and up to about 25,000, and the oxyethylene groups in the mixture constituting from about 20 to 90 weight percent of the mixture.

9. A surface active mixture of conjugated polyoxyethylene-polyoxypropylene compounds containing in their structure the nucleus of propylene glycol, oxyethylene groups and oxypropylene groups, the structure of the compounds being such that all of the oxyethylene groups are present in polyoxyethylene chains that are attached to the nucleus of the propylene glycol at the sites of its reactive hydrogen atoms, and all of the oxypropylene groups are present in polyoxypropylene chains that are attached to the polyoxyethylene chains, the average molecular weight of the oxypropylene chains being at least about 900 and up to about 25,000, and the oxyethylene groups in the mixture constituting from about 20 to 90 weight percent of the mixture.

10. A surface active mixture of conjugated polyoxyethylene-polyoxypropylene compounds containing in their structure the nucleus of glycerine, oxyethylene groups and oxypropylene groups, the structure of the compounds being such that all of the oxyethylene groups are present in polyoxyethylene chains that are attached to the nucleus of the glycerine at the sites of its reactive hydrogen atoms, and all of the oxypropylene groups are present in polyoxypropylene chains that are attached to the polyoxyethylene chains, the average molecular weight of the oxypropylene chains being at least about 900 and up to about 25,000, and the oxyethylene groups in the mixture constituting from about 20 to 90 weight percent of the mixture.

11. A surface active mixture of conjugated polyoxyethylene-polyoxypropylene compounds containing in their structure the nucleus of ethylene-diamine, oxyethylene groups and oxypropylene groups, the structure of the compounds being such that all of the oxyethylene groups are present in polyoxyethylene chains that are attached to the nucleus of the ethylene-diamine at the sites of its reactive hydrogen atoms, and all of the oxypropylene groups are present in polyoxypropylene chains that are attached to the polyoxyethylene chains, the average molecular weight of the oxypropylene chains being at least about 900 and up to about 25,000, and the oxyethylene groups in the mixture constituting from about 20 to 90 weight percent of the mixture.

12. A surface active mixture of conjugated polyoxyethylene-polyoxypropylene compounds containing in their structure the nucleus of acetamide, oxyethylene groups and oxypropylene groups, the structure of the compounds being such that all of the oxyethylene groups are present in polyoxyethylene chains that are attached to the nucleus of the acetamide at the sites of its reactive hydrogen atoms, and all of the oxypropylene groups are present in polyoxypropylene chains that are attached to the polyoxyethylene chains, the average molecular weight of the oxypropylene chains being at least about 900 and up to about 25,000, and the oxyethylene groups in the mixture constituting from about 20 to 90 weight percent of the mixture.

13. A method for preparing surface active, conjugated polyoxyalkylene compounds, which comprises, condensing ethylene oxide with a relatively low molecular weight reactive hydrogen compound having not over 6 carbon atoms per molecule and having from 2 to about 6 reactive hydrogen atoms and having not over 6 carbon atoms per molecule and being selected from the group consisting of aliphatic polyhydric alcohols, alkylamines, alkylene polyamines, cyclicamines, amides, and polycarboxylic acids, to produce a polyoxyethylene polyol, and subsequently condensing propylene oxide with said polyoxyethylene polyol, the amount of propylene oxide used being such that the molecular weight of the compounds attributable to the propylene oxide is from about 900 to 25,000 and the amount of ethylene oxide used being such that the oxyethylene groups constitute from 20 to 90 weight percent of the compounds.

14. A method in accordance with claim 13 wherein the amount of propylene oxide used is such that the molecular weight of the compounds attributable to propylene oxide is from 1500 to 15,000.

References Cited in the file of this patent

UNITED STATES PATENTS

| | | |
|---|---|---|
| 2,174,761 | Schutte et al. | Oct. 3, 1939 |
| 2,425,845 | Toussaint et al. | Aug. 19, 1947 |
| 2,552,532 | De Groote | May 15, 1951 |
| 2,602,064 | De Groote | July 1, 1952 |
| 2,626,913 | De Groote | Jan. 27, 1953 |
| 2,673,882 | Griffin | Mar. 30, 1954 |
| 2,674,619 | Lundsted | Apr. 6, 1954 |
| 2,679,515 | De Groote | May 25, 1954 |